Figure 3:
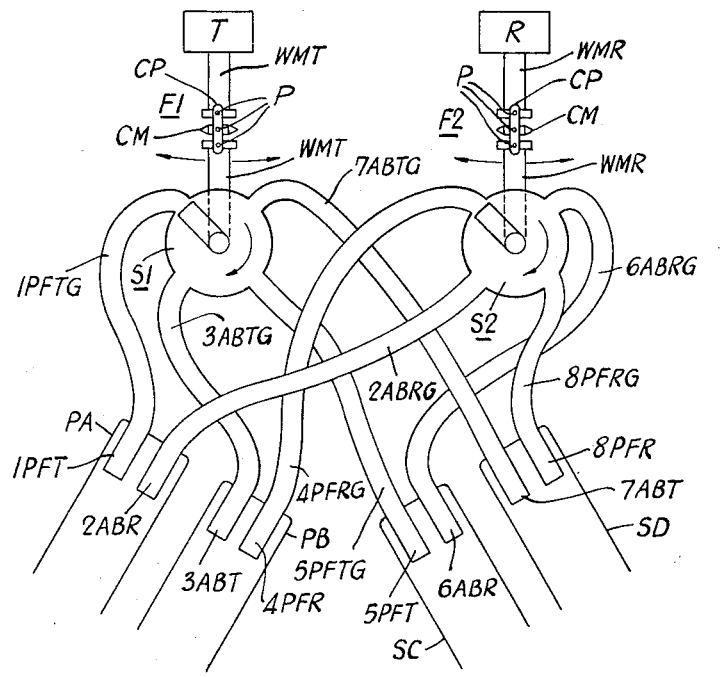

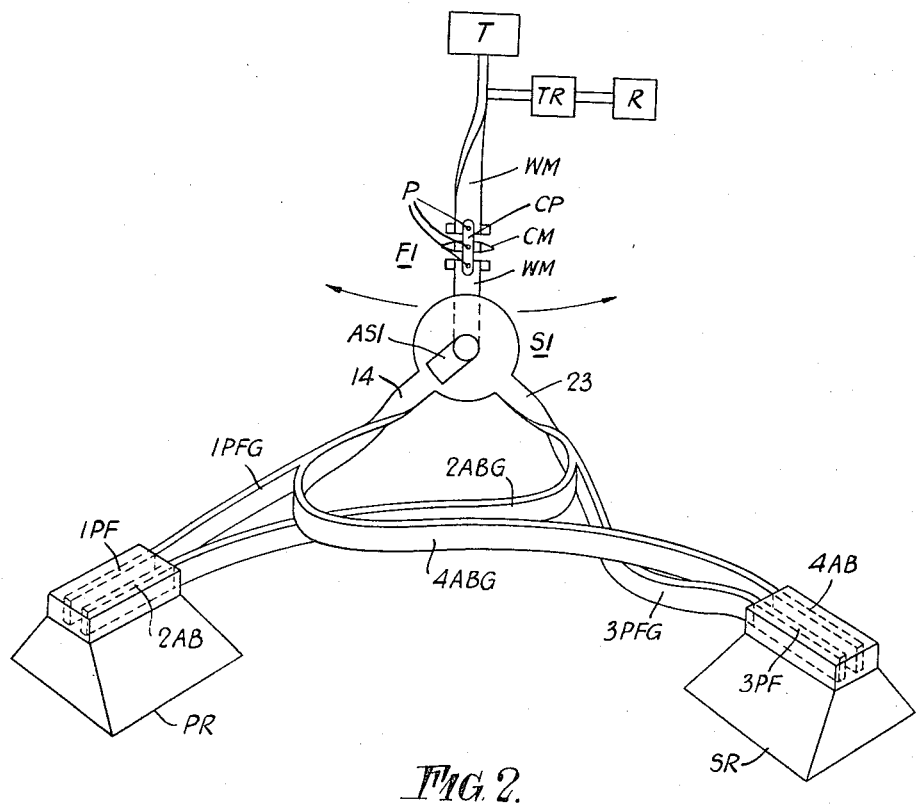
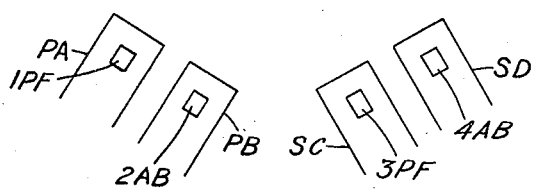

United States Patent Office 2,921,303
Patented Jan. 12, 1960

2,921,303
RADIO SPEED INDICATING INSTALLATIONS FOR AIRCRAFT

Mervyn Morgan, Chelmsford, England, assignor to Marconi's Wireless Telegraph Company Limited, London, England, a company of Great Britain Application January 22, 1953, Serial No. 332,590

Claims priority, application Great Britain February 14, 1952

3 Claims. (Cl. 343—8)

This invention relates to radio speed indicator installations for aircraft and more particularly to such speed indicating arrangements of the known kind in which the speed of an aircraft is ascertained by transmitting radio energy downwards from two different points in the aircraft and receiving reflected energy back again, and phase or time comparing the reflected energies in order to ascertain the aircraft speed since the Doppler frequency changes produced in the reflected energies will depend upon the aircraft speed. For the sake of brevity in description radio speed indicating arrangements of this nature will herein be termed multiple transmission Doppler speed indicating arrangements.

The invention is illustrated in and explained in connection with the accompanying drawings in which Figure 1 is an explanatory diagram of a known arrangement and Figures 2 and 3 show diagrammatically two embodiments of this invention.

In order that the difficulties which the present invention seeks to avoid may be the better understood there will first be described a multiple transmission Doppler speed indicating arrangement which is not in accordance with the present invention. This arrangement, which is of the pulse transmission type is illustrated in Figure 1. It utilises four slotted wave guide mouths 1PF, 2AB, 3PF and 4AB arranged each in one of four reflectors PA, PB, SC and SD suitably mounted in the under part of the aircraft so as to point more or less downwards, there being two reflectors (PA, PB) directed to port and two (SC, SD) to starboard. Each reflector contains, as stated, a single wave guide mouth and the individual wave guide mouth and reflector arrangements are arranged so as to operate as follows:

(1) The port outer reflector PA is arranged to transmit forward to port, (2) The starboard outer reflector SD is arranged to transmit backward to starboard, (3) The port inner reflector PB is arranged to transmit backward to port, and (4) The starboard inner reflector SC is arranged to transmit forward to port.

The wave guide mouths 1PF and 3PF in the outer port and inner starboard reflectors PA and SC respectively are energised in phase and the wave guide mouths 2AB and 4AB in the other two reflectors in anti-phase, the four guide mouths being energised in pairs alternately for part of a cycle, the energisation of the guide mouths in the two outer reflectors being followed by the energisation of the guide mouths in the two inner reflectors. Since transmission is by pulses, the same wave guides and reflectors can be and are used both for transmission and reception by employing, in manner well known per se, so-called transmitter-receiver (T-R) cells (not shown) in the wave guide channels to the usual crystal mixers (not shown). In some cases—where it is necessary to align the aerial system including the four reflectors and wave guide mouths on to the true track of the aircraft—the said aerial system is so mounted that it can be swung, for example for some 60° to 70°, with respect to the mid-line of the aircraft.

It will readily be appreciated that in an arrangement as just described with four reflectors and four wave guide mouths in the aerial system it is difficult to keep the overall dimensions of the said aerial installation conveniently small more especially if the aerial system is to be movable. In any event the arrangement involves the provision of a fairly large dielectric window in the skin of the aircraft to allow of the passage of the radio energy downwards, and from the structural point of view such windows are objectionable if of any great size. The present invention seeks to overcome or reduce this difficulty and reduce the size of a multiple transmission Doppler speed indicating arrangement.

According to this invention in its broadest aspect a multiple transmission Doppler speed indicating arrangement comprising port and starboard reflectors and associated wave guide mouths is characterized in that each reflector contains two wave-guide mouths.

It has been established by experiment that the wide polar diagram of each reflector system is not seriously distorted by the presence of a second guide mouth in the reflector and this accounts for the fact that a pulsed system in accordance with the invention is quite satisfactorily operable though at first sight this would not be expected. In this connection it will be understood that in a pulsed system in accordance with this invention the two guide mouths in the same reflector are connected to the associated apparatus through a T-R cell.

Figure 2 shows one form of pulse transmission system in accordance with this invention. Here there are two reflectors PR and SR, one (PR) to port and the other (SR) to starboard, and four waveguide mouths 1PF, 2AB, 3PF and 4AB of which the first two are in the port reflector and the last two in the starboard one. Transmission and reception is effected by the same wave guides leading to the respective mouths.

There is a transmitter T and a receiver R the latter being coupled through an ordinary T-R cell TR with a main wave guide WM extending from the transmitter. This main wave guide incorporates a simple flexible joint $F_1$ of ordinary design. As shown it is of the knuckle joint type and consists of the end of the fixed portion of the wave guide WM, the beginning of the moving portion of the guide WM, a short length of connector guide CM and connecting plates CP (one each side) carrying pivot pins at P allowing the moving portion of the guide WM to be swung as indicated by the arrows. Thus the complete assembly of reflectors, and other apparatus on the side of the joint $F_1$ remote from the transmitter can be swung, when required, through some 60 to 70 degrees for purposes of drift indication as known per se. Beyond the joint $F_1$ the wave guide WM extends to a two-way wave guide switch conventionally indicated at $S_1$ of known design through which either of two branch guides 14, 23 may be fed.

The switch $S_1$ is of the known rotating type with a rotating arm $AS_1$ which can be moved to have its end opposite the entry to either of the branch guides 14, 23. The branch guide 14 divides into two guides 1PFG and 4AGB which feed the mouths 1PF and 4AB respectively while the guide branch 23 leads through guides 2ABG and 3PFG to the mouths 2AB and 3PF respectively. In operation pulse transmission first takes place from two wave guide mouths one in each reflector and these two guide mouths then operate for reception to receive the reflected pulse energy. Then the other two wave guide mouths one in each reflector, transmit and then receive. In this way only two reflectors PR and SR are used instead of four.

A defect of the arrangement of Figure 2 and indeed of any pulse system using a T-R cell is, however, that it cannot be employed below a certain minimum height above ground because of the recovery time required by a T-R cell. Moreover, the known four reflector aerial system of Figure 1 and also the two-reflector system of Figure 2 are not suitable for use with C.W. (continuous wave) as distinct from pulse operation because of the difficulty met with in C.W. working that the transmitted signal at high power level may return to the receiver crystal mixer at a level sufficient to burn out the crystal or overload the receiver stages. The object of a further feature of the invention is to overcome these difficulties and to provide improved aerial arrangements for a multiple transmission Doppler speed indicating system which shall be such as to enable the system to be operated with C.W. and therefor at quite low aircraft heights.

According to this further feature of invention an aerial system for a multiple transmission C.W. Doppler speed indicating arrangement comprises four reflectors each containing two wave guide mouths, one for transmission and the other for reception, there being two reflectors to port and two to starboard, one of the wave guide mouths in each reflector being arranged for operation in the forward direction and the other being arranged for operation in the rearward diection and the sequence of transmission and reception is such that, after transmission from two guide mouths, one in each of two different reflectors (one port and one starboard) reception is effected by two other guide mouths, one in each of the remaining two reflectors.

The use of separate wave guides for transmission and reception of course obviates limitations involved by the use of T-R cells since such cells are eliminated, while the sequence of transmission and reception avoids the difficulty that coupling between wave guide mouths in the same reflector would prevent two guide mouths in a common reflector being used, one for transmission and the other for reception, in a C.W. system with no T-R cell. The system is, therefore, capable of C.W. operation and its overall dimensions are no larger than those of the known four reflector pulse system of Figure 1.

One way of carrying out the above defined further feature of this invention is illustrated in Figure 3. This represents a C.W. system employing four reflectors PA, PB, SC, SD inclined downwards, two (PA, PB) to port and two (SC, SD) to starboard. The reflectors, wave guide mouths and wave guides are individually as shown in Figure 2 but in order not to complicate Figure 3 the reflectors and wave guide mouths are diagrammatically represented in that figure. There are eight wave guide mouths in all, two in each of the four reflectors and arranged (in the order port to starboard) to operate as follows:

(1) In-phase transmitting wave guide mouth 1PFT transmitting forward to port in reflector PA.

(2) Anti-phase receiving wave guide mouth 2ABR receiving backwards to port, also in reflector PA.

(3) Anti-phase transmitting wave guide mouth 3ABT transmitting backwards to port in reflector PB.

(4) In-phase receiving wave guide mouth 4PFR receiving forward to port also in reflector PB.

(5) In-phase transmitting wave guide mouth 5PFT transmitting forward to starboard in reflector SC.

(6) Anti-phase receiving wave guide mouth 6ABR receiving backward to starboard also in reflector SC.

(7) Anti-phase transmitting wave guide mouth 7ABT transmitting backward to starboard in reflector SD.

(8) In-phase receiving wave guide mouth 8PFR receiving forward to starboard also in reflector SD.

These wave guide mouths are used in the following pairs:

(a) 1PFT transmitting with 4PFR receiving;
(b) 3ABT transmitting with 2ABR receiving;
(c) 5PFT transmitting with 8PFR receiving;
(d) 7ABT transmitting with 6ABR receiving.

In Figure 3 the transmitter T and receiver R are associated with their own main wave guides WMT and WMR each containing its own flexible joint $F_1$ or $F_2$ serving the same purpose as the joint $F_1$ of Figure 2 and similar to that joint. Beyond the joints $F_1$, $F_2$ the guides WMT and WMR extend to the moving members of wave guide switches $S_1$, $S_2$ which are conventionally represented and are like the switch $S_1$ of Figure 2 except that each provides connection to any one of four branch guides instead of, as in Figure 2, two branch guides only. As will be apparent from Figure 3 the transmitter and receiver T and R can be coupled to the appropriate branch guides (which terminate in the guide mouths in the reflectors) as required to perform the foregoing operations. In Figure 3 these branch guides are given the same references as the mouths to which they lead with the added reference letter G e.g. branch guide 1PFTG leads to mouth 1PFT.

I claim:

1. A pulse multiple transmission Doppler speed indicating arrangement for aircraft, said arrangement comprising two reflectors, one to port and the other to starboard, and four wave guides each terminating in a wave guide mouth of which there are two in each reflector, and means for enabling transmission and reception from and to said mouths in the following sequence: first, transmission from two wave guide mouths one in each reflector; then reception of reflected pulse energy by the same two guide mouths; then transmission by the other two guide mouths; then by reception by the last mentioned two guide mouths.

2. A continuous wave multiple transmission Doppler speed indicating arrangement for aircraft, said arrangement comprising four reflectors, each containing two wave guide mouths, one for transmission and the other for reception, there being two reflectors to port and two to starboard, one of the wave guide mouths in each reflector being arranged for operation in the forward direction and the other being arranged for operation in the rearward direction, separate wave guides to said wave guide mouths, continuous wave radio transmitting and receiving apparatus, and wave guide means connecting said guides to said apparatus to enable transmission and reception to be so effected that when sequential transmission from two guide mouths one in each of two different reflectors (one port and one starboard) takes place reception is effected simultaneously with said sequential transmission by two other guide mouths, one in each of the remaining two reflectors.

3. A multiple transmission Doppler speed indicating arrangement for aircraft comprising a radio transmitter, a radio receiver, a radiating and receiving means connected to said transmitter and receiver and comprising two reflectors of which one is to port and the other to starboard, two wave guides, a two way wave guide distributor switch feeding said two wave guides, each of said two waves guides being divided into two branch wave guides, one branch of each wave guide leading to one of said reflectors and the other branch of each wave guide leading to the other of said reflectors whereby said two way wave guide distributor switch is arranged to connect said wave guides to said transmitter and said receiver in pre-determined sequence.

References Cited in the file of this patent

UNITED STATES PATENTS

| | | |
|---|---|---|
| 2,403,625 | Wolff | July 9, 1946 |
| 2,426,228 | Mackta | Aug. 26, 1947 |
| 2,455,639 | Anderson | Dec. 7, 1948 |
| 2,576,943 | Jenks | Dec. 4, 1951 |
| 2,597,607 | Alford et al. | May 20, 1952 |
| 2,597,862 | Grieg | May 27, 1952 |
| 2,720,589 | Proctor | Oct. 11, 1955 |